US012685343B2

(12) United States Patent (10) Patent No.: US 12,685,343 B2
Adair et al. (45) Date of Patent: Jul. 21, 2026

(54) AEROSOL GENERATION DEVICE

(71) Applicant: JT International S.A., Geneva (CH)

(72) Inventors: Kyle Adair, Lisburn (GB); Olayiwola Olamiposi Popoola, Walton-on-Thames (GB); Peter Loveday, Epsom (GB)

(73) Assignee: JT International S.A., Geneva (CH)

( * ) Notice: Subject to any disclaimer, the term of this patent is extended or adjusted under 35 U.S.C. 154(b) by 430 days.

(21) Appl. No.: 18/035,620

(22) PCT Filed: Nov. 4, 2021

(86) PCT No.: PCT/EP2021/080655
§ 371 (c)(1),
(2) Date: May 5, 2023

(87) PCT Pub. No.: WO2022/096580
PCT Pub. Date: May 12, 2022

(65) Prior Publication Data
US 2023/0404168 A1 Dec. 21, 2023

(30) Foreign Application Priority Data

Nov. 6, 2020 (EP) .................................... 20206185
Nov. 6, 2020 (EP) .................................... 20206204

(51) Int. Cl.
*A24F 40/60* (2020.01)
*A24F 40/40* (2020.01)
(Continued)

(52) U.S. Cl.
CPC .............. *A24F 40/60* (2020.01); *A24F 40/40* (2020.01); *A24F 40/65* (2020.01); *A24F 40/90* (2020.01); *G06F 3/044* (2013.01)

(58) Field of Classification Search
CPC .......... A24F 40/10; A24F 40/20; A24F 40/40; A24F 40/42; A24F 40/60; A24F 42/60;
(Continued)

(56) References Cited

U.S. PATENT DOCUMENTS 10,027,016 B2 * 7/2018 Marion ................... A24F 40/65
11,666,102 B2 * 6/2023 Jung ..................... H05B 1/0297
131/328
(Continued)

FOREIGN PATENT DOCUMENTS

EP 3597055 A1 1/2020
WO 2016/079152 A1 5/2016
(Continued)

OTHER PUBLICATIONS

English machine translation of CN 100381082 to Han; Apr. 16, 2008; 14 pages. (Year: 2008).*
(Continued)

*Primary Examiner* — Linda L Gray
(74) *Attorney, Agent, or Firm* — Lerner David LLP

(57) ABSTRACT

An aerosol generating device extending along a longitudinal axis (X) includes
   an outside casing defining an internal volume, the internal volume including a payload compartment; and
   a power supply block arranged in the internal volume of the outside casing.
The outside casing includes a frame delimiting at least a first opening and a first screen arranged in the first opening, the first screen being made of a dielectric material.
The at least first opening of the frame is delimited by an edge, the edge includes a protruding part retaining the corresponding screen in the corresponding opening.

20 Claims, 5 Drawing Sheets

(51) Int. Cl.
    *A24F 40/65*         (2020.01)
    *A24F 40/90*         (2020.01)
    *G06F 3/044*         (2006.01)

(58) Field of Classification Search
    CPC ....... A24F /; A61M 15/0001; A61M 15/0065;
        A61M 15/0086; A61M 2205/02; A61M
        2205/36; A61M 2205/50; A61M
        2205/502; A61M 2205/505
    See application file for complete search history.

(56)         References Cited

U.S. PATENT DOCUMENTS

| | | | | |
|---|---|---|---|---|
| 11,690,963 | B2 * | 7/2023 | Danek | A61M 15/0085 131/328 |
| 12,207,685 | B2 * | 1/2025 | Perrins | A24F 40/46 |
| 2015/0097513 | A1 * | 4/2015 | Liberti | A24F 40/00 224/245 |
| 2015/0224268 | A1 * | 8/2015 | Henry | A24F 40/90 128/202.21 |
| 2019/0239568 | A1 | 8/2019 | Ouyang | |
| 2020/0187560 | A1 | 6/2020 | Trzecieski | |
| 2020/0315262 | A1 * | 10/2020 | Liu | A61M 11/042 |

FOREIGN PATENT DOCUMENTS

| | | |
|---|---|---|
| WO | 2017/102969 A1 | 6/2017 |
| WO | 2018/084835 A1 | 5/2018 |

OTHER PUBLICATIONS

International Search Report for PCT/EP2021/080655 mailed Jan. 25, 2022. 3 pgs.
European Office Action for Application No. 21802362.0 dated Sep. 11, 2024, pp. 1-6.

* cited by examiner

AEROSOL GENERATION DEVICE

CROSS-REFERENCE TO RELATED APPLICATIONS

The present application is a national phase entry under 35 U.S.C. § 371 of International Application No. PCT/EP2021/080655, filed Nov. 4, 2021, published in English, which claims priority to European Application Nos. 20 206 185.9 filed Nov. 6, 2020 and 20 206 204.8 filed Nov. 6, 2020, the disclosures of which are incorporated herein by reference in their entireties.

FIELD OF THE INVENTION

The present invention concerns an aerosol generation device.

BACKGROUND OF THE INVENTION

Different types of aerosol generation assembly are already known in the art. Generally, such assemblies comprise a storage portion for storing an aerosol forming precursor, which can comprise for example a liquid or a solid. A heating system is formed of one or more electrically activated resistive heating elements arranged to heat said precursor to generate the aerosol. The aerosol is released into a flow path extending between an inlet and outlet of the device. The outlet may be arranged as a mouthpiece, through which a user inhales for delivery of the aerosol.

In some aerosol generation assemblies, the precursor is stored in a removable cartridge. The aerosol generation assembly comprises then an aerosol generation device comprising an outside casing which defines a cavity in which the cartridge may be inserted. In order to attach the removable cartridge to the device body, a screw-threaded connection can for example be used. When the cartridge is assembled to the aerosol generation device, the cartridge is said to be in an operation position and the device is able to generate the aerosol. When the precursor is consumed, the cartridge can be easily removed and replaced.

In some known aerosol generation devices, the outside casing comprises some glass components. For example, US 2020/0022409 discloses a device in which a tempered glass cover is disposed on each sides of the exterior surface of an aluminum frame. However, this design prevents the light to shine inside the device and prevents a good transmission to the outside from the antennas arranged inside the casing. On the contrary, U.S. Pat. No. 10,477,890 discloses a device comprising a glass housing formed by a cylindrical tube arranged between two supporting extremities. However, the robustness and the stiffness of such a device is not satisfactory as the cylindrical housing may break easily, for example in case of a fall on the ground.

SUMMARY OF THE INVENTION

One of the aims of the present invention is to provide an aerosol generation devices which solves the above mentioned issues.

For this purpose, the invention relates to an aerosol generation device extending along a longitudinal axis and comprising an outside casing defining an internal volume, the internal volume comprising a payload compartment; a power supply block arranged in the internal volume of the outside casing; the outside casing comprising a frame delimiting at least a first opening and a first screen arranged in the first opening, the first screen being made of a dielectric material; the at least first opening of the frame being delimited by an edge, the or each edge comprising a protruding part retaining the corresponding screen in the corresponding opening.

Indeed, using these features, the device according to the invention presents a good stiffness and robustness thanks to the combination of the frame and the screen arranged into an opening of the frame while enabling a good transmission between the inside and the outside of the device through the screen made of a dielectric material which allows a good transmission of light and wireless signals.

The aerosol generation device according to the invention comprises one or more of the following features, taken solely, or according to any technical feasible combination:
- the or each screen is a glass screen or made of a plastic material;
- the frame further delimits a second opening, the outside casing further comprising a second screen arranged in the second opening;
- the second opening is formed facing the first opening;
  - the outside casing presents generally a parallelepiped extending along the longitudinal axis, the first and second screens forming at least partially a pair of parallel sides of the parallelepiped;
- the or each screen defines an internal surface facing at least partially the internal volume and an external surface opposite to the internal surface;
- the protruding part of the or each edge defines a fixing surface facing a part of the internal surface of the corresponding screen;
- the fixing surface of the protruding part of the or each edge is configured to receive a bonding agent to fix the corresponding screen in the corresponding opening;
- the or each screen is flushed in the corresponding opening or forms with the frame a smooth surface of the outside casing;
- the protruding part of the or each edge extends according to the whole perimeter of this edge;
- further comprising a bracket received in the internal volume to support the power supply block, the bracket being fixed to the frame;
- the protruding part of the or each edge further defines at least one fixing hole facing a receiving hole formed in the bracket, said fixing hole and said receiving hole receiving a fixing mean to fix the bracket to the frame;
- the or each fixing hole is covered by the corresponding screen;
- the or each screen is a plate;
  - the aerosol generation device further comprises an antenna arranged in the internal volume to face at least partially the or at least one of the screens; and
- the aerosol generation device further comprises a capacitive touch panel attached to an internal surface of the or one of the screens;
- the protruding part protrudes towards the internal volume of the device;
- the protruding part extends on a length comprised between 5 mm and 1 cm;
- the screen is arranged in the extension of the frame, defining a continuous outline of the outside casing;
- the antenna extends in the same direction as the first screen and at least a portion of the surface area of the antenna is facing directly the first screen;
- the first screen extends along the longitudinal axis on a length greater than 75% of the length of the device along the longitudinal axis.

3

BRIEF DESCRIPTION OF THE DRAWINGS

The invention and its advantages will be better understood upon reading the following description, which is given solely by way of non-limiting example and which is made with reference to the appended drawings, in which.

DETAILED DESCRIPTION OF THE INVENTION

Figure 1:
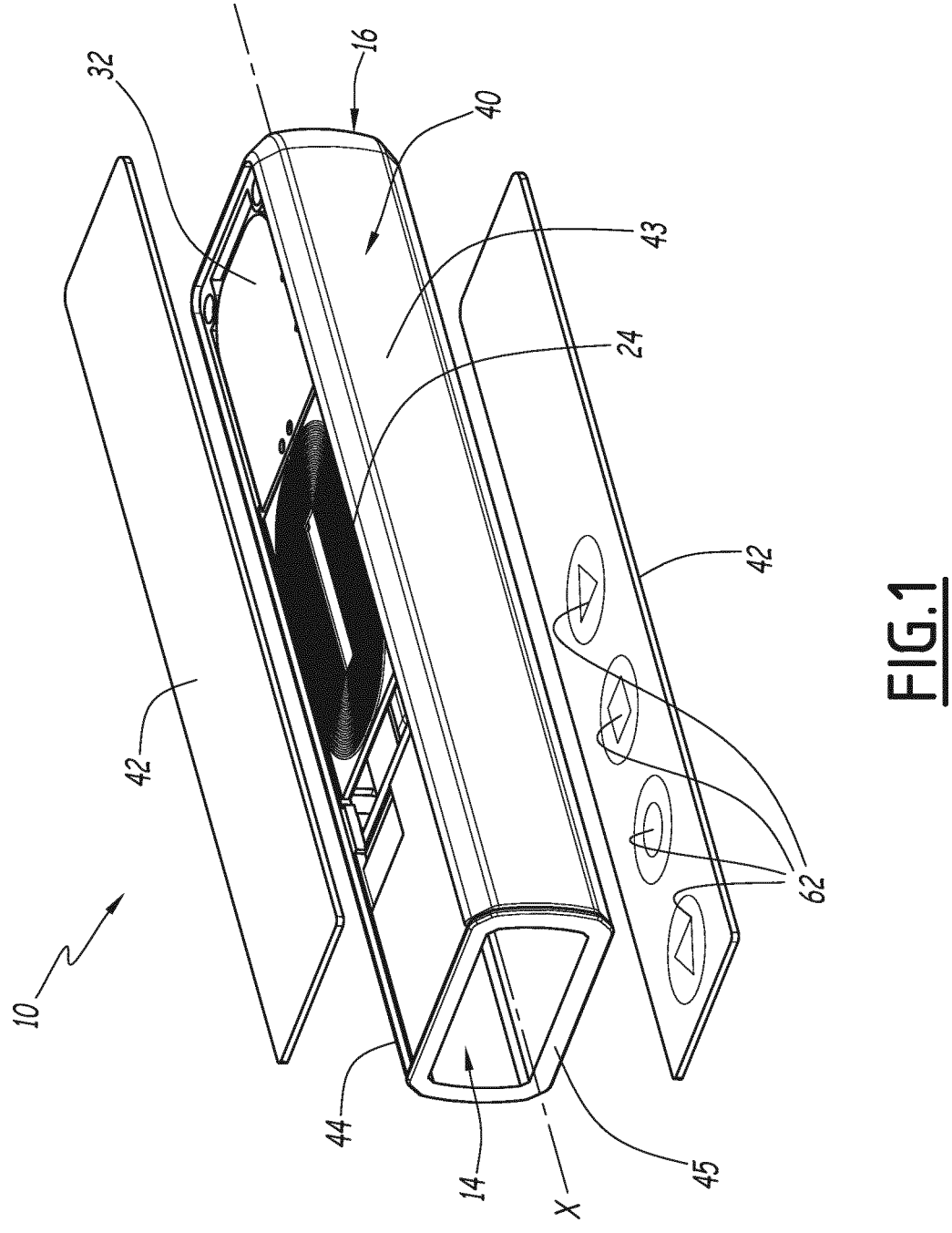
FIG. 1 is a partially exploded perspective view of an aerosol generation device according to the invention, the aerosol generation device comprising a screen.

Before describing the invention, it is to be understood that it is not limited to the details of construction set forth in the following description. It will be apparent to those skilled in the art having the benefit of the present disclosure that the invention is capable of other embodiments and of being practiced or being carried out in various ways.

As used herein, the term "aerosol generation device" or "device" may include a vaping device to deliver an aerosol to a user, including an aerosol for vaping, by means of aerosol generating unit (e.g. an aerosol generating element which generates vapor which condenses into an aerosol before delivery to an outlet of the device at, for example, a mouthpiece, for inhalation by a user). The device may be portable. "Portable" may refer to the device being for use when held by a user. The device may be adapted to generate a variable amount of aerosol, e.g. by activating a heater system for a variable amount of time (as opposed to a metered dose of aerosol), which can be controlled by a trigger. The trigger may be user activated, such as a vaping button and/or inhalation sensor. The inhalation sensor may be sensitive to the strength of inhalation as well as the duration of inhalation to enable a variable amount of vapor to be provided (so as to mimic the effect of smoking a conventional combustible smoking article such as a cigarette, cigar or pipe, etc.). The device may include a temperature regulation control to drive the temperature of the heater and/or the heated aerosol generating substance (aerosol pre-cursor) to a specified target temperature and thereafter to maintain the temperature at the target temperature that enables efficient generation of aerosol.

As used herein, the term "aerosol" may include a suspension of precursor as one or more of: solid particles; liquid droplets; gas. Said suspension may be in a gas including air. Aerosol herein may generally refer to/include a vapor. Aerosol may include one or more components of the precursor.

As used herein, the term "aerosol-forming precursor" or "precursor" or "aerosol-forming substance" or "substance" or "vaporizable material" is used to designate any material that is vaporizable in air to form aerosol. Vaporisation is generally obtained by a temperature increase up to the boiling point of the vaporization material, such as at a temperature up to 400° C., preferably up to 350° C. The vaporizable material may, for example, comprise or consist of an aerosol-generating liquid, gel, or wax or the like or an aerosol-generating solid that may be in the form of a rod, which contains processed tobacco material, a crimped sheet or oriented strips of reconstituted tobacco (RTB), or any combination of these. The vaporizable material may comprise one or more of: nicotine; caffeine or other active components. The active component may be carried with a carrier, which may be a liquid. The carrier may include propylene glycol or glycerin. A flavoring may also be present. The flavoring may include Ethylvanillin (vanilla), menthol, Isoamyl acetate (banana oil) or similar.

DESCRIPTION OF AN EMBODIMENT OF THE INVENTION

The aerosol generation device 10 according to the invention is shown on FIG. 1. In the example of this FIG. 1, the aerosol generation device 10 is designed to operate with a removable cartridge (not showed) which is intended to be received in a payload compartment 14 also visible on FIG. 1. The cartridge comprises a precursor storage portion able to store a precursor and at least a heater able to heat the precursor to generate aerosol. The heater of the cartridge is connected electrically to a power source of the device 10 through a pair of contacts arranged in both cartridge and aerosol generation device 10. According to another embodiment of the invention, the heater of the cartridge may be coupled with a heating element arranged in the device 10 and powered by the power source of this device 10. In this case, heat is transmitted directly from the heating element of the device to the heater of the cartridge. According to still another embodiment of the invention, the payload compartment 14 defines a fixed, in respect to the device 10, precursor storage portion. In this case, the precursor storage portion can for example be refilled with a precursor.

Figure 2:
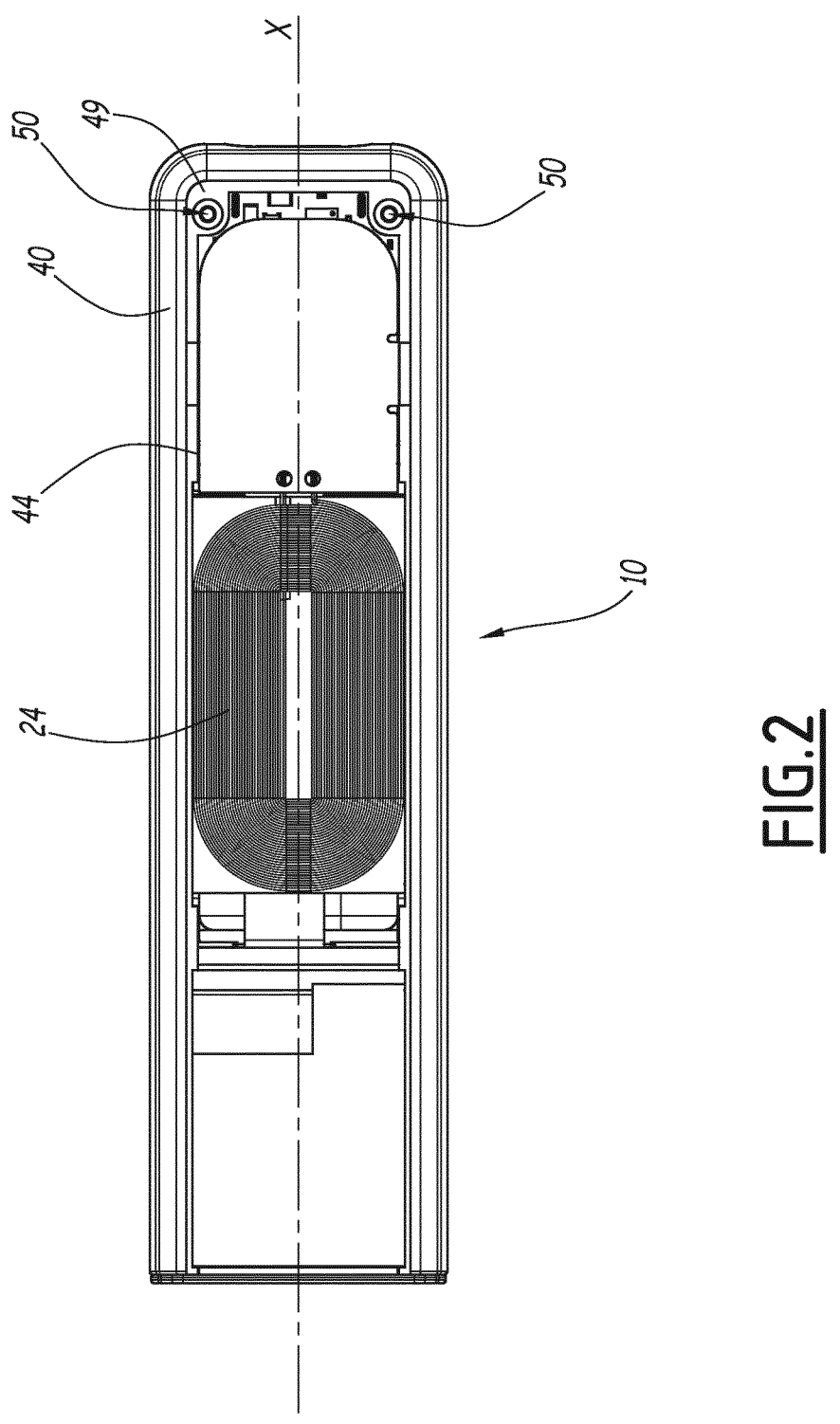
FIG. 2 is a top view of the aerosol generation device of FIG. 1, the screen being not represented.

The aerosol generation device 10 extends along an axis X called hereinafter longitudinal axis X. Referring to FIG. 1, the aerosol generation device 10 comprises an outside casing 16. Referring to FIGS. 1 and 2, the outside casing 16 presents generally a parallelepiped extending along the longitudinal axis X. The outer casing 16 comprises a frame 40 and at least a screen 42, in particular two screens 42 attached to the frame 40. The outside casing 16 extends along the longitudinal axis X and delimits an internal volume of the device 10 able to receive internal components, notably a power supply block 18 and a printed circuit board 34 (shown on FIG. 3). The power supply block 18 comprises a battery, for example a rechargeable lithium-ion battery known in the art. As visible on FIG. 3, the device 10 comprises a bracket 20 received in the internal volume to support the power supply block 18. The bracket 20 is fixed to the frame 40 and forms a support surface on which the power supply block 18 is arranged. At the longitudinal extremity of the support 20 two receiving hole 52 are formed in the bracket 20, as it will be explained below. The printed circuit board 34 comprises a plurality of electronic components configured to control the operation of the aerosol generation device 10. Particularly, the printed circuit board 34 comprises a controller (not showed) configured to control for example a voltage provided by the battery to the heater of the cartridge.

The printed circuit board 34 further comprises an antenna 24. The antenna 24 is able to send a request signal towards at least an associated tag, for example by creating an electromagnetic field around, and to receive a data signal from the tag in response to the request signal, for example by analyzing modifications of the electromagnetic field created by the tag. The data signal can contain at least a piece of information stored in the tag. Thus, the antenna 24 is able to implement a passive communication with the tag. According to another embodiment, the antenna 24 is also able to implement an active communication with the tag. Advantageously, the antenna 24 is able to communicate with the associated tag via an NFC protocol (Near-Field Communication protocol), an RFID protocol (Radio-frequency identification protocol) or a Bluetooth protocol. Alternatively, the antenna is able to communicate with an external system to the device 10, such as a user communication device. In another variant, the antenna 24 is a wireless charging coil used to charge the device by induction by cooperating with an external charging coil. In some embodiments, the board 34 may comprise a plurality of antennas 24, each antenna 24 being able to communicate using a different protocol.

As shown on FIG. 1, the antenna 24 is associated with a screen 42, the antenna 24 facing at least partially the said screen 42. Advantageously, the screen 42 defines a surface area greater than the surface area defined by the antenna 24. As shown on FIG. 1, the antenna 24 faces here totally the screen 42. Therefore, all the surface area of the antenna 24 faces a part of the surface area of the screen 42. The antenna 24 extends in the same direction as the associated screen 42. In particular, the antenna 24 extends along the longitudinal axis X.

The antenna 24 is facing directly the screen 42. By "facing directly", it is understood that the antenna 24 and the screen 42 are arranged facing each other without another component of the device being arranged between them. The antenna 24 and the screen 42 may be in contact or not.

The device 10 according to the invention enables therefore a better communication of the antenna 24 with an external system through the screen 42 which allows a good transmission of the wireless signal of the antenna 24. The arrangement of the screen 42 in the frame 40 allows to minimize the interferences of the outer casing 16 with the antenna 24 signal while enabling a good stiffness and robustness of the device 10. Moreover, the positioning of the antenna 24 parallel to the screen 42 without any component between them allows also to a better communication with the external system.

Each screen 42 is made of a dielectric material. A dielectric material is a poor conductor of electricity, but an efficient supporter of electrostatic fields. Advantageously, each screen 42 is made of glass. In a variant, each screen 42 is made of a plastic material. In another variant, the first screen 42 is made of glass and the second screen 42 is made of a plastic material. By glass, it is understood a hard, noncrystalline and at least partially transparent material, notably produced by fusion, usually consisting of mutually dissolved silica and silicates to form a soda and lime glass. Each screen 42 is advantageously made of an at least partially transparent material. By transparent, it is understood that allows the passage of light and wireless signals.

In the example shown on FIG. 1, each screen 42 is a plate. In a variant, each screen 42 may be curved. Each screen 42 presents for example a thickness comprised between 0.5 mm and 4 mm, advantageously between 1 mm and 3 mm. The two screens 42 forming at least partially a pair of parallel sides of the parallelepiped. Each screen 42 extends along the longitudinal axis X on a length greater than 75% of the length of the device 10 along the longitudinal axis X, notably a length greater than 90%. Each screen 42 defines an internal surface facing at least partially the internal volume of the device 10 and an external surface opposite to the internal surface.

The frame 40 may be notably made of materials amongst: aluminum, stainless steel, titanium. The frame 40 presents a parallelepiped form defined by two side walls 43 extending along the longitudinal axis X. The two side walls 43 are parallel and are linked by two oblong borders 45 perpendicular to the longitudinal axis X and arranged at the two extremities of the device 10 along the longitudinal axis X. The two side walls 43 are perpendicular to the screens 42. As shown on FIG. 1, one of the two borders 45 defines an access to the payload compartment 14. The frame 40 further defines two openings in which an associated screen 42 is arranged. Each opening is defined by the side walls 43 and the borders 45. In particular, the first opening is formed facing the second opening. Each opening presents here a rectangular form with rounded edges. Advantageously, each screen 42 is flushed in the corresponding opening or forms with the frame 40 a smooth surface of the outside casing 16. The user therefore does not perceive the gap between the frame 40 and the screen 42 while touching the external surface of the device 10.

Figure 3:
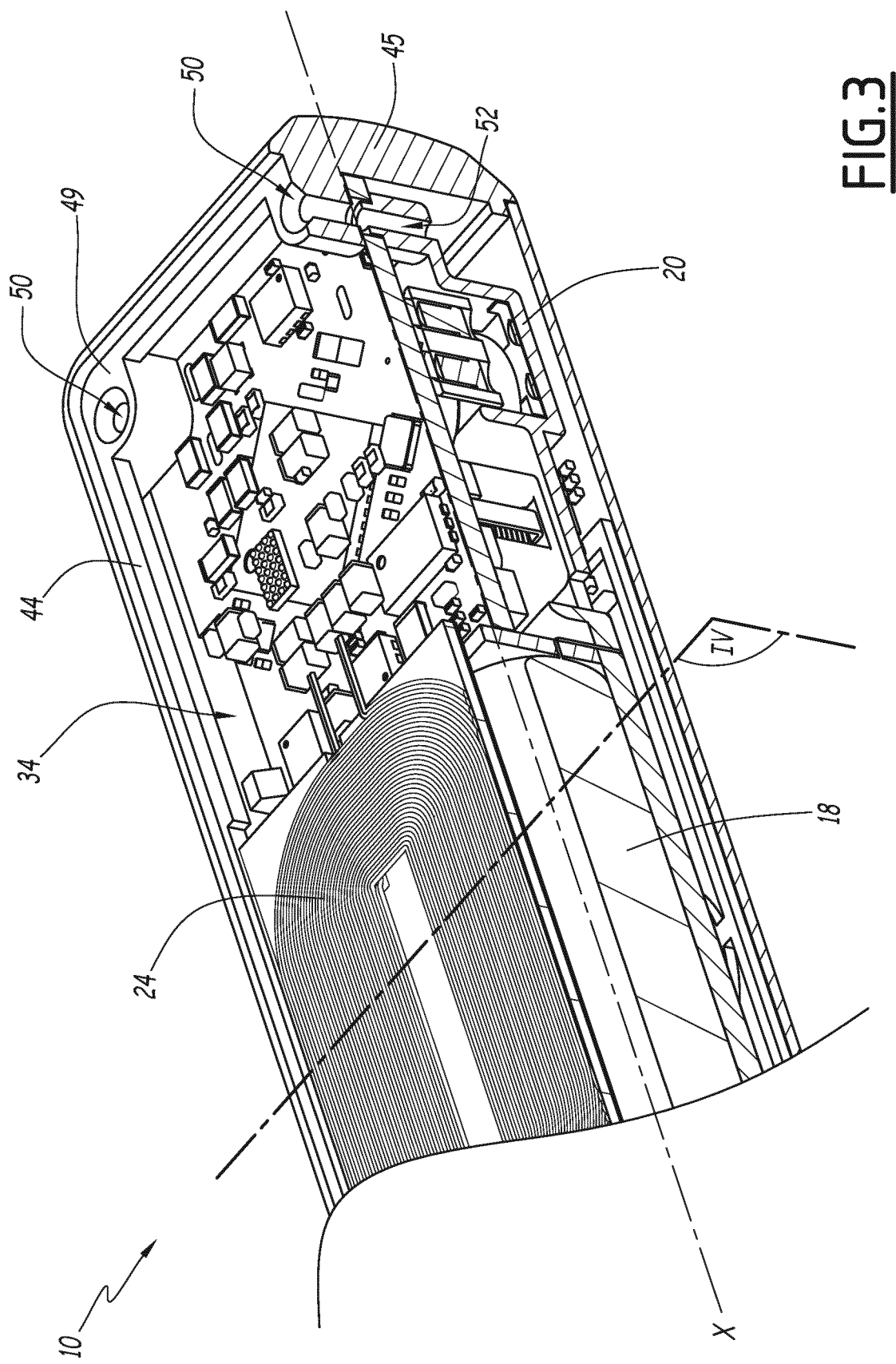
FIG. 3 is a partial perspective view of the aerosol generation device of FIG. 1, the screen being not represented.
Figure 4:
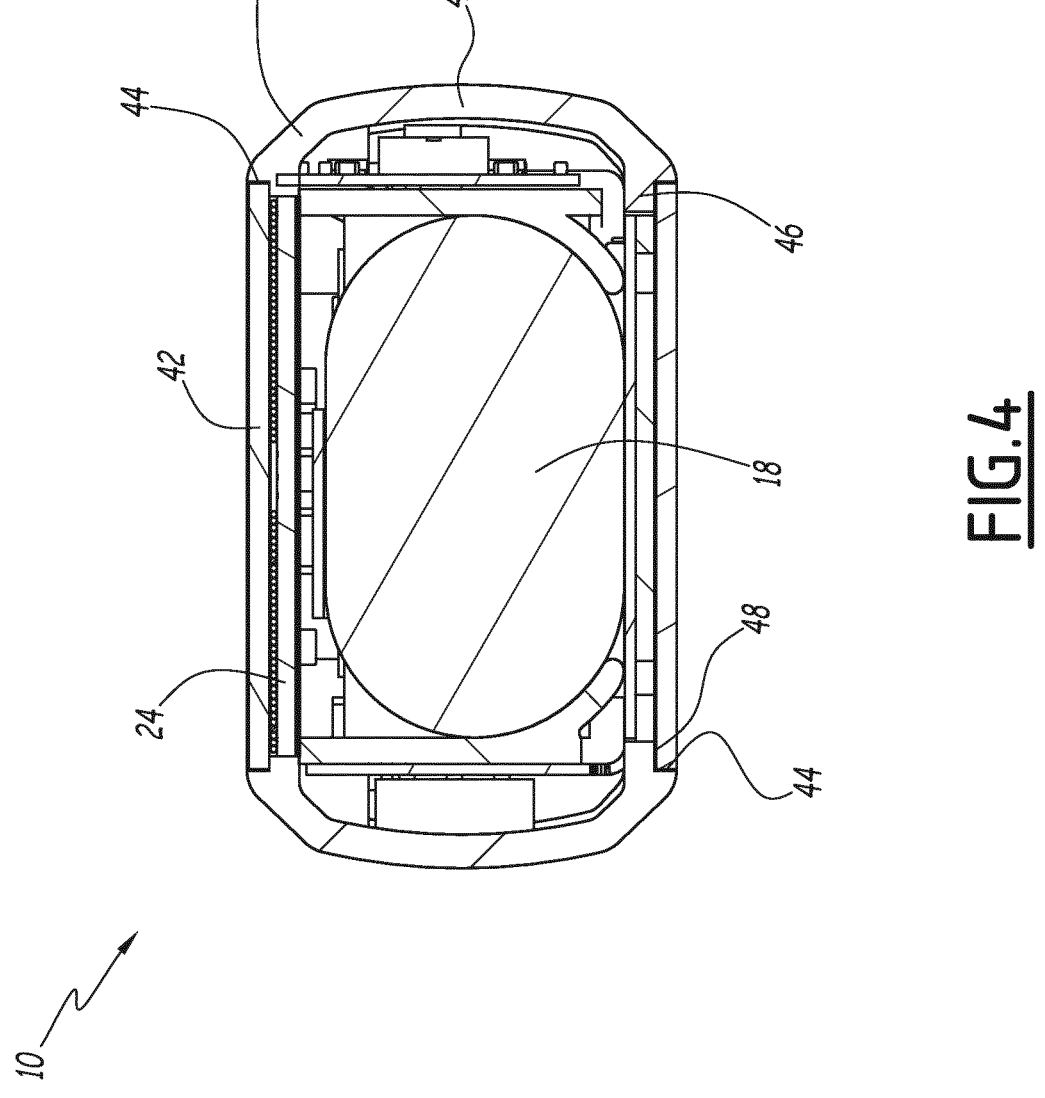
FIG. 4 is a cross sectional view of the aerosol generation device according to plane IV of FIG. 3.

As visible on FIGS. 3 and 4, each opening is delimited by an edge 44. Each edge 44 comprises a protruding part 46 retaining the corresponding screen 42 in the corresponding opening. The protruding part 46 protrudes from a side wall 43 or from a border 45 towards the internal volume of the device 10. The protruding part 46 extends for example on a length comprised between 5 mm and 1 cm. In particular, the protruding part 46 extends according to the whole perimeter of the associated edge 44. The protruding part 46 forms a stop against which the screen 42 is resting. The protruding part 46 of each edge 44 defines a fixing surface 48 facing a part of the internal surface of the corresponding screen 42. As visible on FIG. 4, the screen 42 is arranged in the extension of the frame 40, defining a continuous outline of the outside casing 16. In other word, the outer casing 16 and the screen 42 are arranged in the extension of each other to provide a continuous and soft aspect for the user, without protuberances.

Each screen 42 is attached to the outer casing 16 using fixing means amongst: bonding, molding, and mechanical fixation such as screwing. In particular, in the example of FIG. 1, the fixing means are a bonding agent which may be arranged on the whole perimeter of the edge 44 or at least on the majority of the perimeter to fix the corresponding screen 42 in the corresponding opening.

The protruding part 46 of one or of each edge 44 further defines at least one fixing hole 50 facing a receiving hole 52 formed in the bracket 20. The fixing hole 50 and the receiving hole 52 are able to receive a fixing mean to fix the bracket 20 to the frame 40, notably a screw. Each fixing hole 50 is covered by the corresponding screen 42. In particular, each fixing hole 50 is arranged near to the border 45 arranged at the extremity of the internal volume along the longitudinal axis X, opposite to the payload compartment 14. The edge 44 comprises two abutments 49 protruding from the two corners of the internal volume in which a corresponding fixing hole 50 is arranged. In the example shown on FIG. 4, the device 10 comprises just two fixing holes 50 arranged on one side of the device 10. In particular, the two fixing holes 50 are disposed on the same side as the antenna of the tag reader 24.

Figure 5:
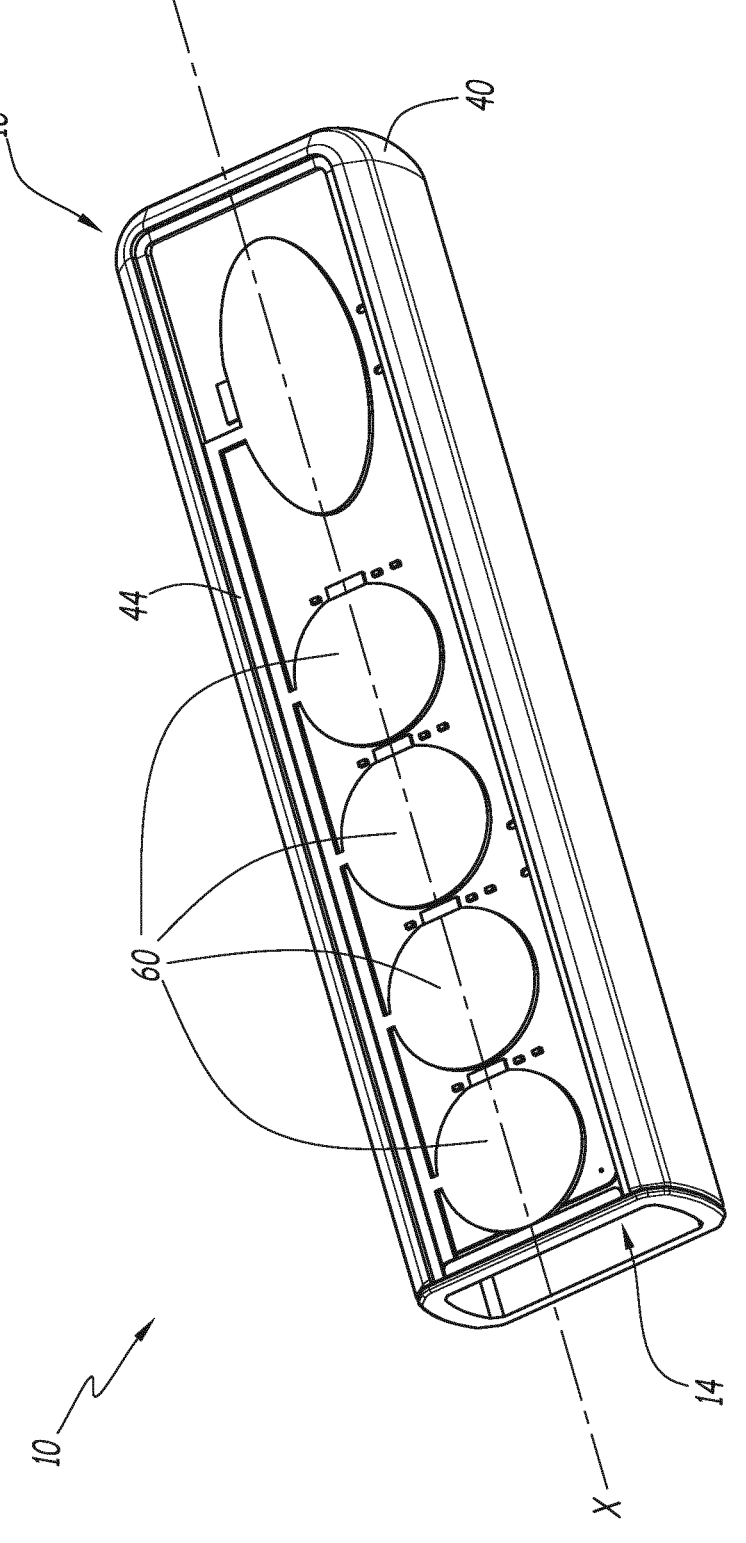
FIG. 5 is a perspective view of the other side of the aerosol generation device of FIG. 1, the screen being not represented.

As shown on FIG. 5, the device 10 further comprises a capacitive touch panel 60 attached to the internal surface of one of the screens 42. Here, the touch panel 60 is arranged on the opposite side of the antenna 24. Alternatively, the touch panel 60 may be arranged aside the antenna 24, under the same screen 42. The touch panel 60 is connected to the printed circuit board 34 to control the operation of the aerosol generation device 10. Each screen 42 further comprises screen printed symbols 62 (shown on FIG. 1), associated to the touch panel 60 and/or for regulatory markings.

It will be apparent to those skilled in the art that the invention is capable of other embodiments and of being practiced or being carried out in various ways. For example, the device 10 may comprises four screens 42 arranged on each side of the casing 16 and/or each screen 42 may present for example a square or oval shape.

The invention claimed is:

1. An aerosol generating device extending along a longitudinal axis (X) and comprising:

an outermost casing defining an internal volume, the internal volume comprising a payload compartment;

a power supply block arranged in the internal volume of the outermost casing;

wherein the outermost casing defines a frame delimiting at least a first opening and a first screen arranged in the first opening, the first screen made of a dielectric material, wherein the frame is formed by a first border, a second border, a first sidewall extending between the first border and the second border, and a second sidewall extending between the first border and the second border;

wherein the first opening of the frame is delimited by an edge, wherein the edge is defined by the first border, the second border, the first side wall, and the second side wall, the edge comprising a protruding part retaining the first screen in the first opening, wherein the frame and the first screen form a smooth surface of the outermost casing.

2. The aerosol generating device according to claim 1, wherein the first screen is a glass screen or made of a plastic material.

3. The aerosol generating device according to claim 1, wherein the frame further delimits a second opening, the outermost casing further comprising a second screen arranged in the second opening.

4. The aerosol generating device according to claim 3, wherein the second opening is formed facing the first opening.

5. The aerosol generating device according to claim 4, wherein the outermost casing presents generally a parallelepiped extending along the longitudinal axis (X), the first and second screens forming at least partially a pair of parallel sides of the parallelepiped.

6. The aerosol generating device according to claim 1, wherein the protruding part protrudes towards the internal volume of the device.

7. The aerosol generating device according to claim 6, wherein the protruding part extends on a length between 5 mm and 1 cm.

8. The aerosol generating device according to claim 1, wherein the first screen is arranged in an extension of the frame, defining a continuous outline of the outermost casing.

9. The aerosol generating device according to claim 1, wherein:

the first screen defines an internal surface facing at least partially the internal volume and an external surface opposite to the internal surface; and the protruding part of the edge defines a fixing surface facing a part of the internal surface of the first screen.

10. The aerosol generating device according to claim 9, wherein the fixing surface of the protruding part of the edge is configured to receive a bonding agent to fix the first screen in the first opening.

11. The aerosol generating device according to claim 1, wherein the first screen is flushed in the first opening.

12. The aerosol generating device according to claim 1, wherein the protruding part of the edge extends along a whole perimeter of the edge.

13. The aerosol generating device according to claim 1, further comprising a bracket received in the internal volume to support the power supply block, the bracket fixed to the frame.

14. The aerosol generating device according to claim 13, wherein the protruding part of the edge further defines at least one fixing hole facing a receiving hole formed in the bracket, said at least one fixing hole and said receiving hole receiving a fixing mean to fix the bracket to the frame.

15. The aerosol generating device according to claim 14, wherein the at least one fixing hole is covered by the first screen.

16. The aerosol generating device according to claim 1, wherein the first screen is a plate.

17. The aerosol generating device according to claim 1, further comprising an antenna arranged in the internal volume to face at least partially the first screen.

18. The aerosol generating device according to claim 17, wherein the antenna extends in a same direction as the first screen and at least a portion of the surface area of the antenna is facing directly the first screen.

19. The aerosol generating device according to claim 1, wherein the first screen extends along the longitudinal axis (X) on a length greater than 75% of the length of the device along the longitudinal axis (X).

20. The aerosol generating device according to claim 1, further comprising a capacitive touch panel attached to an internal surface of the first screen.

* * * * *